Jan. 22, 1957 W. O. JENKINS ET AL 2,778,442
METHOD AND APPARATUS FOR REMOVING
SUSPENDED SOLIDS FROM HOT GAS
Filed Jan. 8, 1952 8 Sheets-Sheet 1

INVENTORS:
WILLIAM O. JENKINS
HAROLD B. MENARDI
BY:
ATT'Y

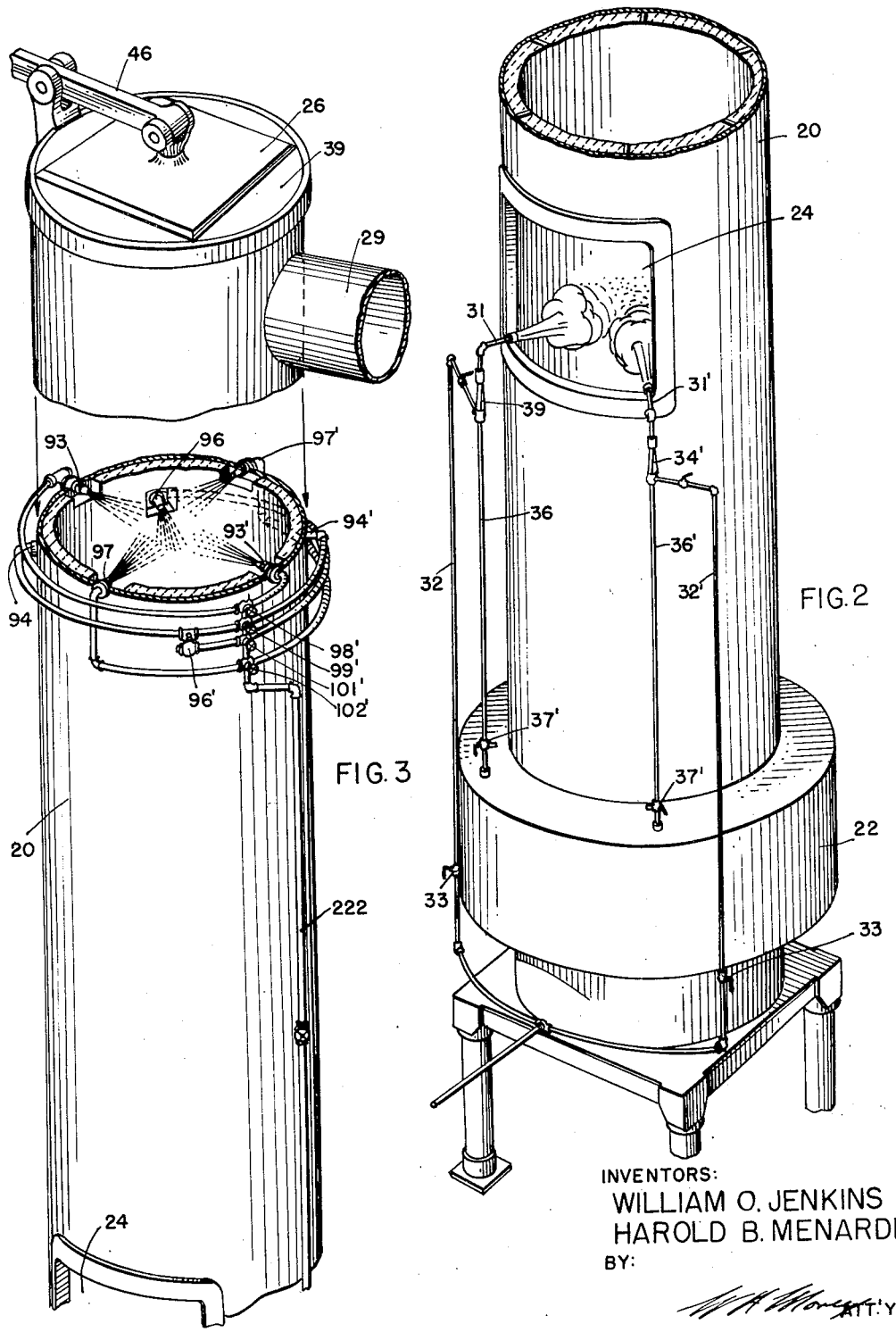

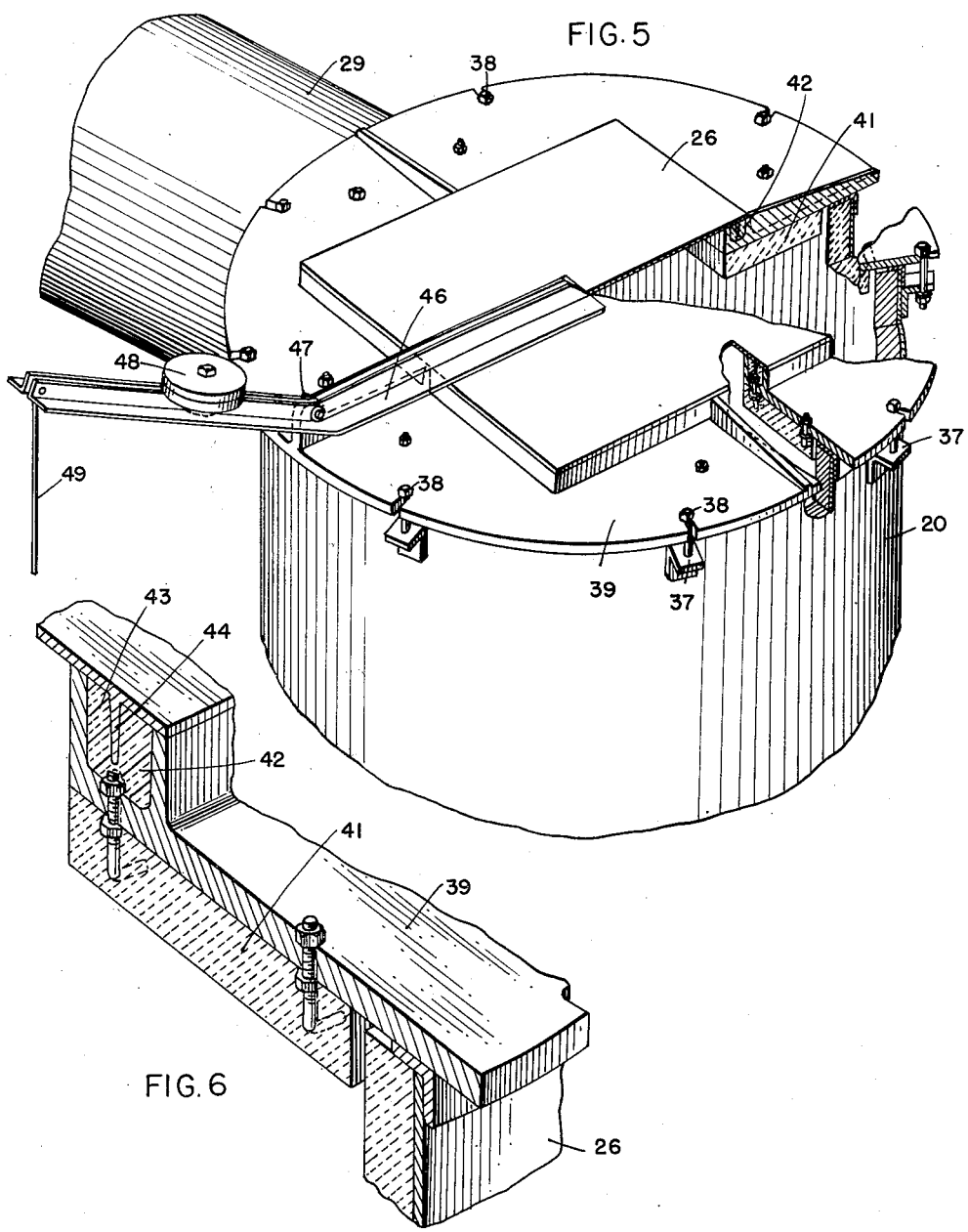

Jan. 22, 1957 W. O. JENKINS ET AL 2,778,442
METHOD AND APPARATUS FOR REMOVING
SUSPENDED SOLIDS FROM HOT GAS
Filed Jan. 8, 1952 8 Sheets-Sheet 5
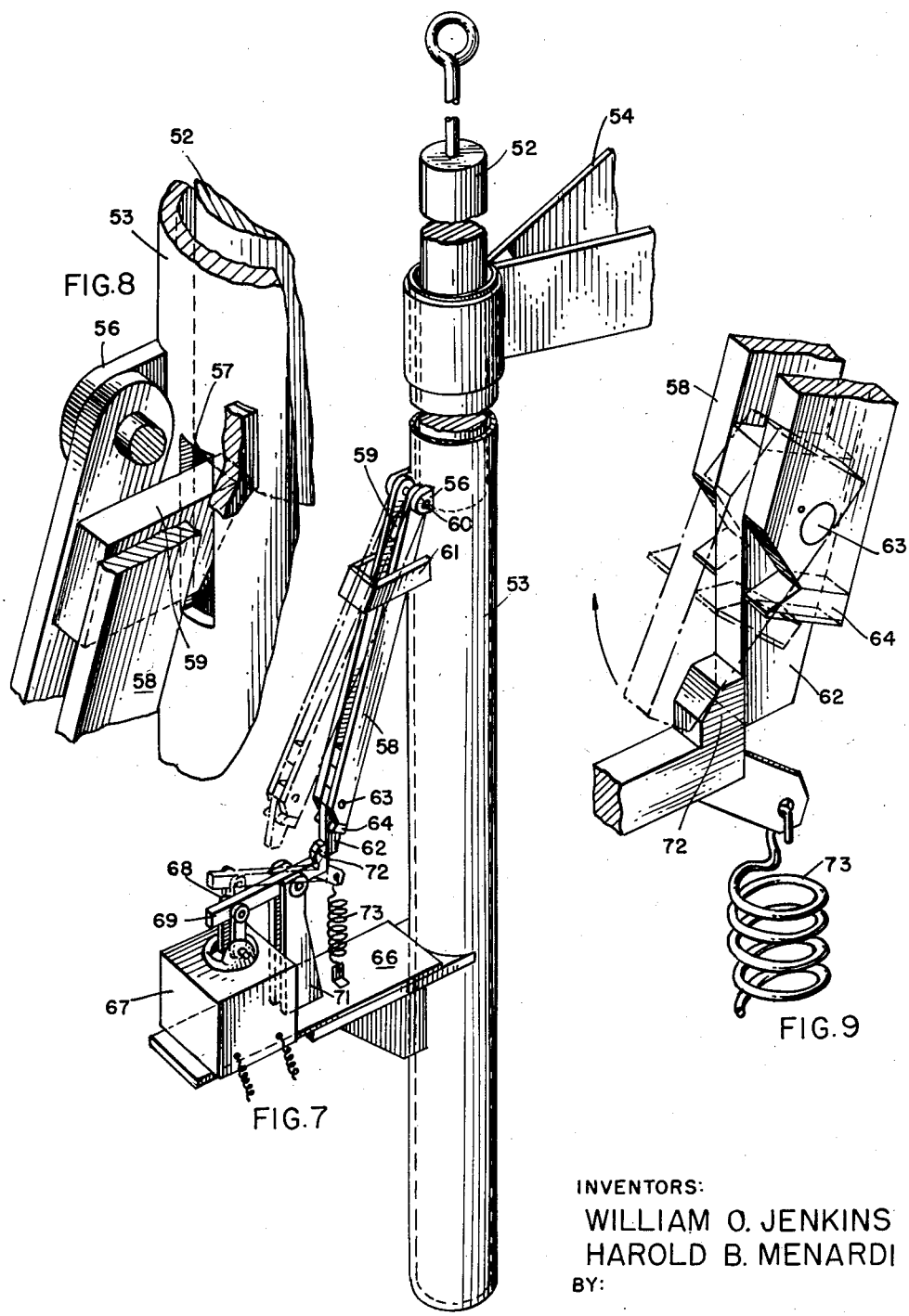
INVENTORS:
WILLIAM O. JENKINS
HAROLD B. MENARDI
BY:
*W. H. Morey* ATT'Y Jan. 22, 1957
W. O. JENKINS ET AL
2,778,442
METHOD AND APPARATUS FOR REMOVING
SUSPENDED SOLIDS FROM HOT GAS
Filed Jan. 8, 1952
8 Sheets-Sheet 6
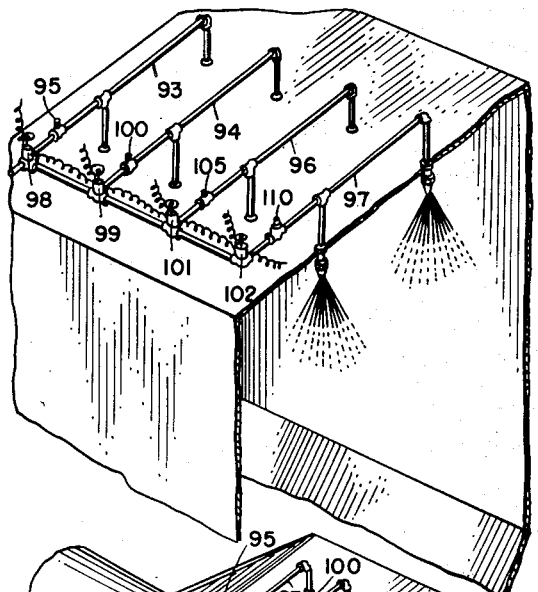
INVENTORS:
WILLIAM O. JENKINS
HAROLD B. MENARDI
BY:
ATT'Y

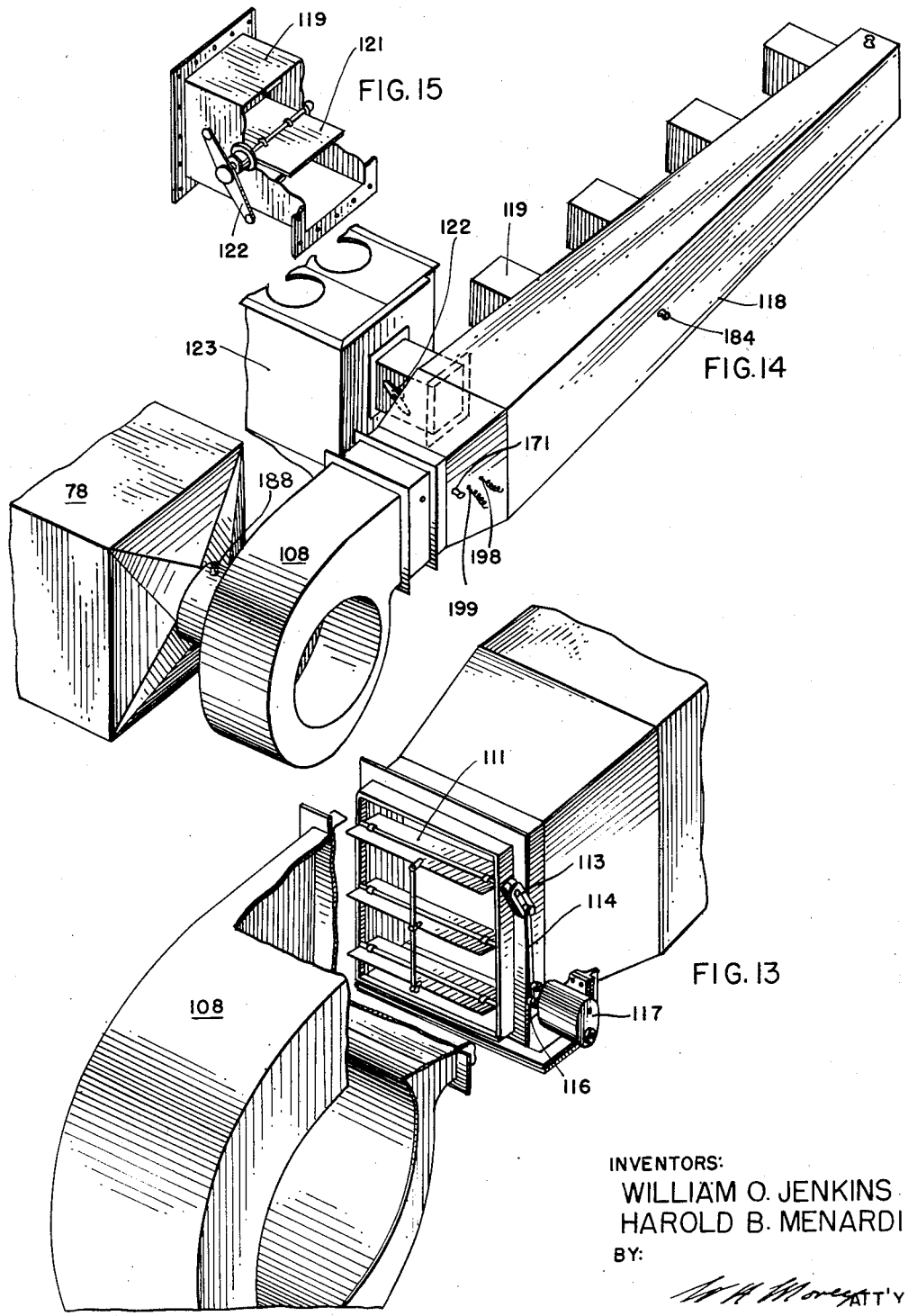

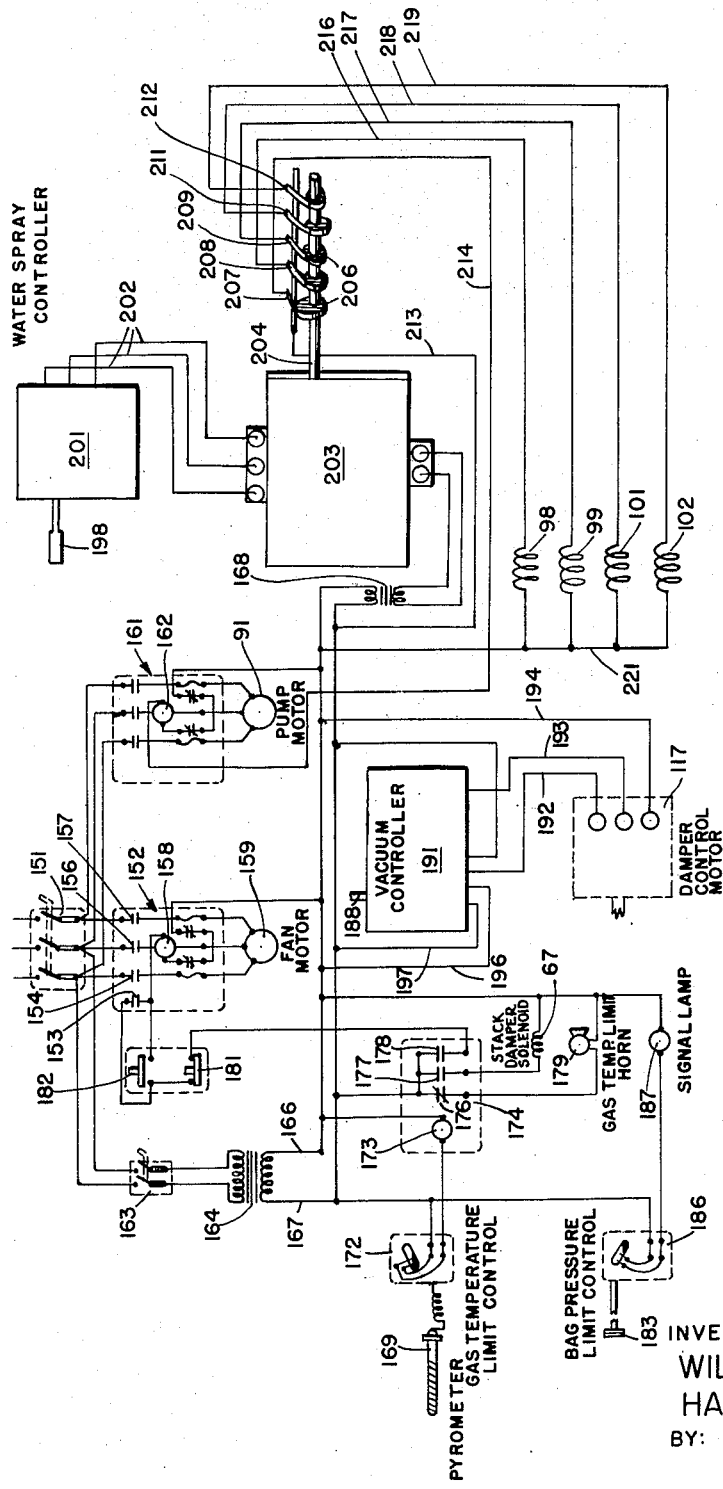

United States Patent Office 2,778,442
Patented Jan. 22, 1957

2,778,442

METHOD AND APPARATUS FOR REMOVING SUSPENDED SOLIDS FROM HOT GAS

William O. Jenkins, Norwalk, and Harold B. Menardi, El Segundo, Calif., assignors to Whiting Corporation, Harvey, Ill., a corporation of Illinois Application January 8, 1952, Serial No. 265,412

10 Claims. (Cl. 183—6)

This invention is directed to apparatus for eliminating solids from a stream of gas, and is particularly well adapted for eliminating solids from the hot gases discharged from gray iron cupolas and the like.

The problem of safely separating the solids from the hot gases discharged by the cupolas represents one of the most difficult current problems in dust collection due in part to the very high percentage of fine particles carried by the fumes, the high temperature of the gases, the diverse and variable character of both the quantity and composition of the discharge, the presence of combustible gases, and to the very practical consideration of maximum acceptable cost. There have been many devices proposed which offer a partial solution to the problem, but each of these has been deficient in failing to adequately meet one or more of the above outlined difficulties. The growing public consciousness of the dangers and adverse effects of air pollution has made the problem critical.

It is therefore an important object of this invention to provide means for safely, economically and efficiently collecting the solids discharged by a cupola and the like.

More specifically, the objects of this invention include the provision of relatively inexpensive means for safely collecting substantially all of the solids discharged by a cupola, for virtually eliminating combustible gas from the solids collecting system, for adequately controlling the composition, dilution, velocity and temperature of the gases treated in the system, which incorporates novel means for collecting and discharging the solids and which is adapted for use in substantially all climates.

Further objects of this invention include the provision of a solids collecting system of the type described, which will efficiently collect a majority of the particles finer than 5 microns, which incorporates means for prolonging the life of the fine dust collection portion of the system, which avoids the detrimental collection of moisture in portions of the system, which provides means for reducing the velocity of the air and thus obtain a deposition of solids without correspondingly increasing the volume of the conduit through which the air is passing, and which incorporates novel control means for preventing improper operation of the invention.

Other objects, pertaining to various novel components and combinations thereof and the method of operation, are disclosed in the following detailed description and in the appended drawings, in which:

Figure 2 is a partial perspective elevation of the lower portion of one of the cupolas illustrating a burner arrangement;

Figure 3 is a partial perspective elevation of an upper portion of a cupola broken away to disclose water sprays installed in the cupola stack;

Figure 5 is a detailed partial perspective view of the door and cupola structure partially illustrated in Figure 4;

Figure 6 is a partial perspective elevation of the structure shown in Figure 5;

Figure 7 is a partial perspective of a top door control device;

Figure 8 is a partial perspective of a portion of the device shown in Figure 7;

Figure 9 is a partial perspective of another portion of the device shown in Figure 7, illustrating the operation of the latch mechanism;

Figure 10 is a partial perspective of a spray chamber;

Figure 11 is a perspective of the spray chamber illustrated in part in Figure 10 and mechanism associated therewith;

Figure 12 is a partial perspective of the solids discharging mechanism associated with the spray chamber illustrated in Figures 10 and 11;

Figure 13 is a partial perspective of a fan discharge louver mechanism;

Figure 14 is a partial perspective view of a portion of the fine dust collecting system;

Figure 15 is a partially broken-away perspective of a valve mechanism utilized in the portion of the structure shown in Figure 14;

Figure 16 is a diagram of the control circuit and mechanism for use of this invention;

Figures 1, 17:
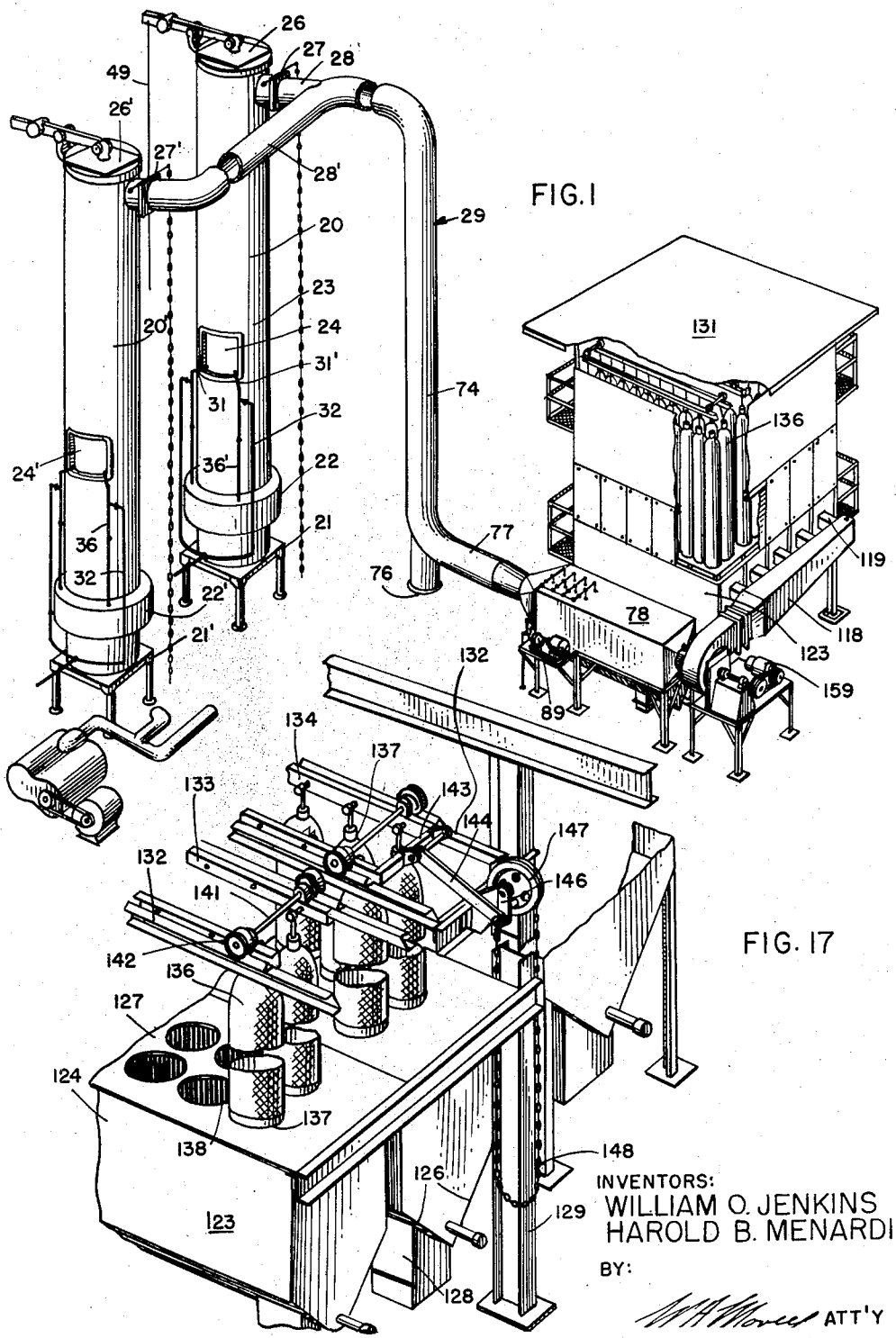
Figure 1 is a partially broken-away schematic drawing of this invention as applied to a pair of alternately operating cupolas.
Figure 17 is a partial detailed perspective view of the fine dust collecting portion of this invention.

In brief, this invention contemplates the use of a cupola having a top closed by a door and a charging opening situated some distance below the top through which the coke, limestone, iron and other components are introduced into the cupola. Air under pressure is introduced through a windbox below the charge door in a manner well known to the art. A relatively large elongated conduit exposed to the air connects the upper portion of the closed top cupola to a spray chamber having cross-sectional area somewhat larger than the corresponding area of the conduit, water sprays being disposed in the chamber for cooling the gases. The cooled gases then pass to the inlet of a fan, the outlet of which is connected by suitable ducts to a plurality of bag filters.

The capacity of the fan is such that not less than 150% of the air introduced into the cupola through the windbox is drawn into the cupola through the charging opening, thus permitting the ignition and complete combustion of the combustible gases generated during the operation by burners disposed at the charging opening. The heat of the gases is dissipated by radiation during the passage of the gases through the conduit, but nevertheless their temperature is usually destructively high when they enter the spray chamber. At this point, a quantity of water sufficient to reduce the gas temperature to not more than about 600° is introduced, the quantity of water added being less than the maximum quantity which can be evaporated by the gases. This sudden cooling reduces the volume of the gases sufficiently to limit the velocity to 10 linear feet per minute, with the result that a very substantial portion of the suspended solids is deposited on the bottom of the chamber which is provided with a solids removing mechanism. The quantity of water added by the sprays is controlled by thermostats disposed between the fan and bag filters.

Other regulating means are provided for holding substantially constant the weight of air passing through the fan. The fine solids which do not settle from the air stream in the spray chamber are collected in the bag filters, which are preferably formed of flexible glass fiber impregnated with a resin containing silica. Horizontally disposed bag shaking means are provided for loosening a layer of dust which forms on the interior of the bags. The water sprays are not actuated until the temperature of the gases reaches about 500°, with the result that gases at temperatures below 500° do not contain appreciable quantities of water. Above 500° the quantity of moisture carried by the gases is appreciable, but in either event the content and temperature is such that the gases leaving the bags are above the dew point, thus avoiding condensation of moisture within the bags. Damage to the bags by excessive temperature is avoided by utilization of a temperature limiting device which, when actuated, breaks the circuit to both the fan and water spray pump motors, and, in addition, opens the door of the top of the cupola.

The general arrangement above described is illustrated in Figure 1 wherein the subject invention is applied to a pair of alternately operating cupolas 20—20' each having legs 21—21', windboxes 22—22' and bodies 23—23' defining charging openings 24—24'. The windboxes may be supplied with air by any conventional means, such as the motor driven blower and conduit system shown in the lower portion of Fig. 1. Doors 26—26' seal the top of each of the cupolas in such manner as to cause discharge of the gases through manually controlled slide valves 27—27' and the conduits 28—28' to an elongated conduit 29 exposed to the atmosphere for a considerable portion of its length and preferably fabricated of stainless steel or other corrosion resisting material adapted for high temperature use. As shown more clearly in Figure 2, a pair of burners 31—31' project into each cupola at charging door level and are supplied with combustible gas through pipes 32 having valves 33. Air is supplied to burner mixing tubes 34—34' through conduits 36—36' communicating with the windbox 22. Check valves 37—37' or the like are provided in each of the pipes 36—36' to permit the entry of atmosphere air during periods when super-atmospheric pressure does not exist in the windbox 22. The burners are thus provided with an air supply of a positive nature obtained at a point remote from the charging door, with the result that the expulsion of incombustible gases from the charging door will not extinguish the burners 31—31'.

Figure 4:
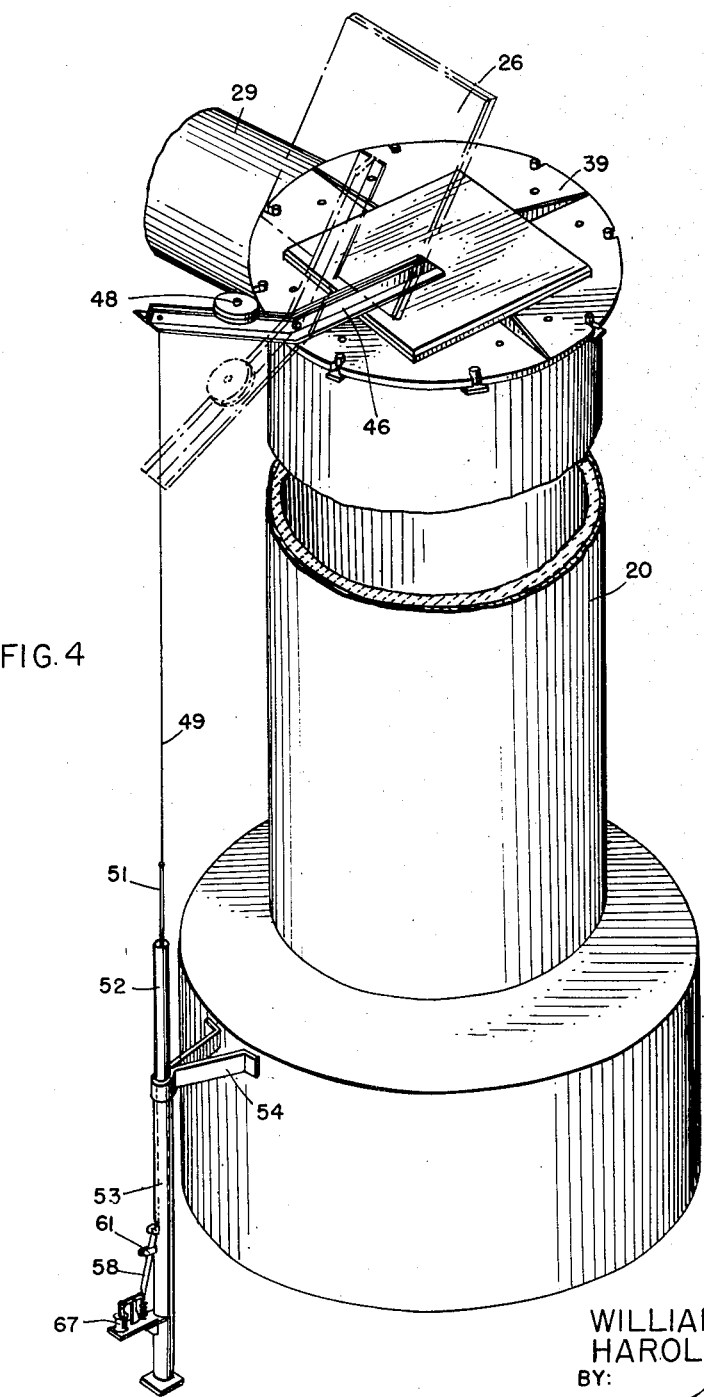
Figure 4 is a partial perspective elevation of a cupola disclosing the arrangement of the top door and door control mechanism.

As shown in Figures 4, 5 and 6, the upper portion of the cupola body 20 is provided with laterally extending radially disposed lugs 37 engaged by bolts 38 which also engage a circular cap 39 extending across the cupola and defining a generally rectangular centrally disposed opening. The inner surface of the cap 39 is lined with refractory material, indicated at 41, and is formed to define around the periphery of the central opening a groove, indicated at 42, filled with a suitable sealing material 43, such as metal shot, sand, asbestos or the like. The doors 26 are generally rectangular in shape and include a downwardly projecting flange 44 disposed for entry into the groove 42 when the door 26 is in closed position. An arm 46, secured at one extremity to the door 26, is pivoted to the cap 39, as at 47, and projects outwardly beyond the pivot a substantial distance. A counterweight 48 is slidably secured to the projecting portion of the arm 46, as is a downwardly extending cable 49. A rod 51 connects the cable 49 with a counterweight 52 mounted for free reciprocating movement in an upright guide 53, the latter being suitably secured to the cupola structure by arms 54.

Outwardly projecting ears 56 are secured to the guide 53 on opposite sides of an opening 57 in the guide member 53. A pin 60, extending through the ears 56 pivotally supports a pair of exposed downwardly and outwardly projecting rigid arms 58. A sear 59 is secured to the arms 58 near their upper extremity and projects inwardly through the opening 57 a distance sufficient to intercept the counterweight 52 when the arms 58 are in lowered position. A stirrup 61, secured to the guide 53 around the arms 58, limits the maximum arcuate movement of the arms. A latch 62 is pivotally secured between the arms 58 by a pin 63, and projects downwardly beyond the lower extremity of the arms. Stops 64 secured to opposite sides of the latch are disposed for engagement with the end surfaces of the arms 58 when the latch 62 is rotated in a counterclockwise direction as seen in Figure 7. The extremity of each of the stop members 64 is in alignment with the center of the pin 63 with the result that the latch 62 is free to rotate through a limited arc in a clockwise direction. A shelf 66 is also secured to the guide 53 and supports a solenoid 67 having a core 68 pivotally secured to one extremity of an arm 69. A post 71 pivotally supports the arm 69 between the point of attachment of the core 68 and an end portion 72 which may be moved by energization of the solenoid 67 into the path of the latch 62. A tension spring 73 connects the end portion 72 of the arm 69 and the shelf 66, insuring movement of the arm 69 to a disengaged position when the solenoid 67 is deenergized.

The conduit 29, as previously noted, is exposed to the atmosphere to obtain cooling of the hot gases by radiation and preferably includes an upright section 74 having at its lower extremity a cleanout door 76. A generally horizontal section of conduit 77 connects the upright portion 74 with a spray chamber 78, illustrated in detail in Figures 10, 11 and 12, which may include a flat top and opposed wall members 79 and downwardly converging bottom members 81 defining a trough generally designated 82. A scraper blade 83 is secured to a pipe 84 which projects outwardly from the chamber in such manner as to permit reciprocating of the blade 83 through the length of the trough 82. Near one end of the trough 82 is a downwardly extending chute 86 to which a container 87 may be removably attached.

The chamber 78 is supported on a suitable framework 88 which also supports a hydraulic pump 89 and the motor 91 connected to the pump. The outlet of the pump is connected to a conduit 92 which incorporates a relief valve 104, the discharge of which is connected to a discharge conduit 106 leading to the pump inlet or a sump. An inlet conduit 103 is also connected to the pump. The conduit 92 communicates with solenoid valves 98, 99, 101 and 102, connected in series. Each of these valves discharges into a pair of fan shaped sprays designated respectively 93, 94, 96 and 97. The sprays are preferably arranged to disperse fine droplets of water into the stream of gases passing through the chamber 78 in such manner as to evaporate all the water introduced through the sprays. It is therefore unnecessary that the sprays project laterally sufficiently a distance to wet the walls of the chamber 78. It is also immaterial whether the sprays 93, 94, 96 and 97 are arranged at the top or sides of the chamber. Ordinarily the capacity of the sprays 93, 94, 96 and 97 will be such with respect to the capacity and pressure of the pump 89 that excessive quantities of water are not added to the system. If desired, however, adjustable throttling valves 95, 100, 105 and 110 may be connected between the solenoid valves 98, 99, 101 and 102 and the sprays 93, 94, 96 and 97, respectively, to properly regulate the quantity of water discharged into the system by each spray pair.

A conduit 107 connects the chamber 78 with the inlet of a fan 108 having a discharge 109 provided with pivotally mounted transverse louvers 111, each pivotally connected to the other by a rod 112. A crank arm 113 secured to one of the louvers 111 is connected by a rod 114 to a second crank arm 116 on the shaft of a motor 117 adapted for controlled operation in either direction. The fan 108 discharges through the louvers 111 into a chamber 118 having a plurality of laterally extending discharge ducts 119, each provided with a damper 121 having external control arms 122. The ducts 119 each communicate with a bag chamber 123 (Figure 17) having upright side walls 124, downwardly converging bottom walls 126 and a top 127, the latter being provided with a plurality of equally spaced openings 138. A cleanout rake mechanism similar to that described in connection with the chamber 78 is provided for each of the bag chambers 123. Discharge chutes 128, similar to the chute 87, are also provided for each of the chambers 123 and are adapted to receive cloth or paper bags or other containers into which the collected solids can be transferred for removal.

The chambers 123 are supported on a suitable framework 129 which extends upwardly a considerable distance beyond the upper extremity of the chambers 123 forming an enclosure having a roof 131. Transverse rails 132 are supported by the frame 129 near the roof 131 and slidably support channels 133 carrying a plurality of projecting support arms 134. Cylindrical bags 136 are secured at their upper extremity to metal fasteners 137 which pivotally engage the support arms 134 on the horizontal slidable channels 133. The lower extremities of the bags 136 are secured to collars 137 around the spaced openings 138 in the tops 127. The bags 136 are preferably of fire-resistant material such as flexible glass fiber and are also preferably impregnated with a resin consisting principally of silica and an organic compound, commonly known as a silicone resin. Usually each of the tops 127 is provided with two parallel rows of openings 138, thereby requiring two channels 133 to properly support the bags 136 attached to each chamber 123. To insure proper movement, the channels 133 are suspended as from axles 141 having wheels 142 disposed for movement along the rails 132. At one extremity the channels 133 are also connected by a crossbar 143 to which a crank arm 144 is pivotally secured. The opposite end of the crank arm 144 is pivoted to a crank throw 146 on a wheel 147, mounted for rotation by a pendant chain 148.

To prevent damage and to insure proper operation, control mechanism of the type illustrated diagrammatically in Figure 16 may be employed. This mechanism may include a main switch 151 connected to a suitable source of electric current and connected to a solenoid type starter generally designated 152. The starter 152 is provided with contacts 153, 154, 156 and 157 of the normally open type which are closed by actuation of a solenoid 158. Closing of the contacts 154, 156 and 157 completes the circuit to a motor 159 coupled to the fan 108. A similar starter 161 having a solenoid coil 162 is provided for starting the pump motor 91. The main switch 151 is also connected to a control switch 163 which energizes the primary of a control transformer 164. The secondary of the transformer 164 has leads 166 and 167 connected to the primary of a second control transformer 168. A thermostatic element 169 is mounted near the discharge of the fan 108 as indicated at 171 and is adapted to actuate a switch 172 when the temperature of the gas discharged by the fan exceeds 650° F. The switch 172 connects the lead 167 with lead 166 through a solenoid coil 173 of a relay 174 which is provided with a normally closed contact 176 and normally open contacts 177 and 178. The normally closed contact connects an alarm horn 179 with the leads 166 and 167, in such manner that the circuit through the horn 179 will be completed whenever the current through the relay coil 173 is broken.

Contact 177 completes the circuit through the solenoid 67 (Figure 7) the actuation of which moves the arm 69 into position to engage the latch 62. The third contact 178 completes a circuit from the lead 167 through the normally closed contacts of a stop button 181 to the contact 153. A start button 182 is also provided to momentarily complete a circuit from the contact 178 through a solenoid coil 158 for the starter switch 152 to the lead 166. Upon release of the starter button 182, the solenoid 158 remains energized through connection from the contact 178 to the closed contact 153.

A pressure sensitive device 183 is mounted in the chamber 118, as at 184, and controls the operation of a normally open switch 186, which, upon closing, connects the lead 166 with 167 through a signal lamp 187. A static pressure fitting 188 is arranged in the fan inlet and communicates with a vacuum controller 191 of conventional design, the controller being electrically connected by wires 192 and 193 with damper control motor 117. Operation of the fan 108 produces a negative static pressure which is transmitted to the vacuum controller 191, the latter in turn translating the impulse so generated in such manner as to drive the louver motor 117 in a forward or reverse direction and thereby regulate the position of the louvers 111, thus maintaining a substantially constant negative pressure at the fan inlet. The motor 117 is connected to lead 166 by lead 194 and leads 196 and 197 connect the leads 166 and 167 with vacuum controller 191.

A temperature sensitive element 198 is also disposed near the outlet of the fan 108 as at 199 and is coupled to a conventional type potentiometer instrument 201, the latter being electrically connected by wires 202 to a second control device 203 having a motor (not shown) controlled through the potentiometer 201 and provided with a projecting shaft 204 upon which are mounted a plurality of spaced cams 206. The cams 206 are arranged to close switches 207, 208, 209, 211 and 212 in sequence as the motor is driven in one direction and successively opens these contacts when the motor is driven in the opposite direction. Wire 213 connects lead 167 with one pole of the switches, the other pole of the switch 207 being connected by a wire 214 with the solenoid coil 162 of the pump starter relay 161. Leads 216, 217, 218 and 219 connect switches 208, 209, 211 and 212, respectively, with the solenoid valves 98, 99, 101 and 102. The other leads of the solenoid valves are connected by a wire 221 to lead 166. The secondary of the control transformers 168 is connected to the control device 203 and serves as a source of current therefor.

*Operation*

To place the subject invention in operation a charge is placed in the cupola 20 and ignited, valve 27' for the cupola 20' being closed and the valve 27 for the cupola 20 being opened to establish communication with the conduit 29. A cupola blower supplies air to the windbox 22 under super-atmospheric pressure, the burners 31—31' being ignited preferably after pressure is established in the windbox 22. The main switch 151 is closed as is the switch 163, and the starter button 182 depressed. This energizes the starter delay coil 158, closing contacts 153, 154, 156 and 157, thereby energizing the fan motor 159. Closing the switch 163 energizes the control transformer 64, thereby energizing the relay coil 173 of relay 174, this circuit extending through the normally closed temperature control limit switch 172. Actuation of the coil 173 opens the contact 176 and closes contacts 177 and 178. Closing of the contact 178 is of course necessary to energize the coil 158 of the starter relay 152, the circuit being completed by operation of the spring loaded start button 182. Closing contact 177 of the relay 174 energizes the stack damper solenoid 167, thus moving the arm 69 in a counterclockwise direction as seen in Figure 7. This having been accomplished, the counterweight 52 is lifted manually until its lower edge is above the lip of the sear 59, thus allowing the door 26 to close by gravity. The arms 58 are then moved in a counterclockwise direction until the latch 62 passes the end portion 72 of the arm 69, which places the sear 59 in the path of the counterweight 52.

As the temperature gradually increases to 500° F., the temperature sensitive element 198 actuates the potentiometer 201 and control device 203 in such manner as to close the switch 207 which actuates the pump motor 91. Since the solenoid valves 98, 99, 101 and 102 remain closed, the pump 89 discharges through the relief valve 104. As the temperature increases to about 500°

F., switch 208 is closed in a similar manner to actuate the solenoid valve 98 and allowing the pump 89 to discharge through the sprays 93. The quantity of water discharged by the sprays is regulated in such manner as to insure that all of the water so added will be converted into vapor, thus absorbing a great deal of heat from the gases. This cooling and reduction in volume of the gases, coupled with the somewhat larger cross-sectional area of the chamber 78 as compared to the cross-sectional areas of the conduit 29, reduces the velocity of the gases sufficiently to permit a majority of the coarse solids to settle from suspension to the bottom of the chamber 78. The velocity of gas through the chamber 78 should not exceed 10 feet per minute under any circumstances. The reduction in velocity is of course greater than that which would be obtained by simply increasing the cross-sectional area of the chamber 78 due to the cooling and contraction of the gas by the water sprays. In addition, the water sprays are highly effective in preventing stratification of the gas in the chamber 78, which not only prevents the passage of high temperature gases through the fan, but also avoids establishing a layer of high velocity gases extending through the chamber and capable of suspending solids. It will be understood that the sprays 93, 94, 96 and 97 are operated successively by the solenoid valves 98, 99, 101 and 102 as the temperature increases from about 500° to about 600°.

The switch 172 should open when the gas temperature exceeds 650–700° F., thus opening relay 174, completing the circuit to the horn 179 and opening contacts 177 and 178. Interruption of the circuit through the stack damper solenoid 67 permits the spring 73 to lower the end portion 72 of the arm 79. The arms 58 will thereupon move in a clockwise direction as shown in Figure 7, withdrawing the sear 59 and permitting the counterweight 52 to fall. This opens the door 26 on the top of the cupola 20, permitting the hot gases to exhaust to the atmosphere. Opening contact 178 will of course open the relay 152 and thus stop the fan motor 159.

During the period the fan 108 is in operation, the vacuum controller 191 and the damper control motor 117 vary the position of the louvers 111 in such manner as to hold the negative static pressure at fan inlet substantially constant, regardless of variation in temperature of the gases. If the pressure on the discharge side of the fan 108 should exceed a predetermined limit, as might occur when the bags 136 become clogged, the pressure sensitive device 183 will be actuated, closing switch 186 and lighting the signal lamp 187.

In operation, the cupola generates appreciable quantities of carbon monoxide which, when mixed with proper quantity of oxygen, becomes a combustible and explosive mixture, capable of ignition by a spark or other means. The presence of such gases in a system of the type described is obviously a major safety hazard. The fan 108 is of such capacity and is operated at such speed as to draw into the system through the charging opening 24 a quantity of air not less than 150% and not more than 600% of the quantity of air entering the said box 22. This relatively cool air not only lowers the temperature of the gases somewhat, but insures the presence of sufficient oxygen in the system to burn the carbon monoxide. The high order of turbulence which occurs as the air is drawn in through the charging door insures thorough mixing of the fresh air with the gases. Ignition of the gases is insured by the burners 31—31' which, because of their arrangement at opposite corners along the lower edge of the charging opening, aid in inducing the flow of air into the charging opening. It is of course essential that the quantity of air drawn into the system by the fan 108 be carefully controlled if the other necessary essential conditions for operation of the system are to be maintained, as for example, the speed of flow of gases through the chamber 78, the maximum temperatures of these gases and the rate at which the heat of the gases is dissipated by radiation of the gases through the conduit 29.

It will be appreciated that a very considerable quantity of the heat in the gases is dissipated during passage through the conduit 29 which is exposed to the atmosphere for this purpose. A small percentage of the large particles carried into the system will collect near the cleanout door 76, but the velocity of the gases passing through the conduit 29 is such that a majority of the particles will be carried over into the chamber 78, where they are settled from the gas stream by the reduction in velocity previously described. The solids collected in the bottom of the chamber 78 may be removed by manipulation of the blade 83 and pipe 84, transferring these solids into a container 87 below the opening 86. The fine particles pass through the fan into the chambers 123 and into the bags 136 where they are filtered from the air stream, allowing the cleaned air to escape through the bags.

Eventually a thick layer of fine particles is collected in the bags 136, making cleaning essential. When this operation is required, one of the dampers 121 is closed, shutting off the corresponding chamber 123 from the chamber 118. The chain 148 for the corresponding chamber is then operated, causing the channels 133 to move back and forth in a horizontal plane, imparting a gentle horizontal folding, shaking movement to the bags. It is particularly important that this form of shaking action be employed when using bags made of flexible glass fiber, since it has been found that any attempt to shake such bags by moving the top of the bag up and down results in premature destruction of the fabric. The solids removed by shaking of the chamber 123 are collected in the hoppers 128.

From the foregoing description of the operation of this invention, it will be noted that the temperature of the gases is reduced first by radiation and then by the addition of water which is wholly evaporated. In some instances it is necessary to revise this sequence of operation in order to permit the use of corrodible material in forming the conduit 29. This may be accomplished by transferring the water sprays 93, 94, 96 and 97 from the chamber 78 to the body 20 of the cupola at a point approximately two-thirds of the distance between the charging opening 24 and the top door 26. This form of arrangement is illustrated in Figure 3. Pairs of diametrically opposed sprays 93', 94', 96', and 97' may be disposed in the body 20 of the cupola as illustrated, portions of the insulation in the cupola being cut away to permit entry of the water sprays without directly exposing the spray nozzles to the action of the hot gases. If desired, each of the sprays may be disposed at a slightly different level in order to avoid intersection of the sprays. Each of the pairs of sprays communicates with solenoid valves 98', 99', 101' and 102' connected to the control device in a manner similar to that described in connection with solenoid valves 98, 99, 101 and 102. Water under pressure may be sprayed into the system with a suitable conduit 222 communicating with the pump 89. The sprays 93', 94', 96' and 97' are usually of somewhat larger capacity than the sprays mounted in the chamber 78 and are arranged to discharge a quantity of water sufficient to reduce the temperature of the gases passing through the fan 108 to the temperature limits previously described. It will be understood that all of the water introduced through these sprays is evaporated almost immediately upon introduction into the hot gases.

It is necessary that these sprays be disposed as indicated well above the charging opening 24 in order to permit complete combustion of the carbon monoxide before the temperature of the gases is reduced below the ignition point. The other operating conditions previously described will be correspondingly maintained, except that the velocity of the gases passing through the conduit 29 is considerably reduced. The arrangement illustrated in Figure 3 is considered less desirable than that previously described since the regulation of operation is somewhat more difficult to control.

The foregoing description has been largely confined to a structure utilizing bag type filters formed of a glass fabric and impregnated with resin. These are the most efficient filters for the purposes of this invention, but it should not be understood that fabric filtered devices of other shapes and materials cannot be employed. Cotton, wool or plastic fabrics may be substituted, but are of course usable only at temperatures substantially below those specified. Cotton bags may ordinarily be operated safely at temperatures to about 270° F., while wool bags will withstand approximately 270° F. Certain forms of fabric formed from temperature resistant flexible plastics can withstand temperatures on the order of 350° F. When bags of this nature are employed, it is of course necessary that the water sprays be brought into operation when the gases reach a temperature of about 30° below the maximum bag temperature in order to prevent damage to the filters. It is desirable, however, that water should not be sprayed into the gases until they attain a temperature sufficiently high to insure that they will pass through the fabric at temperatures well above the dew point, since otherwise condensation within the bags will occur. Regardless of the material from which the filters are formed, the water sprays should therefore not be operated at temperatures below 150° F.

As required by R. S. 4888, we have described the preferred embodiment of our invention, but it should not be understood that we wish to limit ourselves to the precise details therein described except as far as described in the appended claims.

We claim:

1. Apparatus for removing solids from a stream of hot gas comprising a fabric filtering element adapted for filtering solids from gas below a maximum gas temperature, a conduit for conveying the hot gas and suspended solids, at least a portion of said conduit defining a heat radiating surface exposed to the hot gas and to the atmosphere, a fan having an inlet communicating with the conduit and an outlet communicating with the filtering element, water sprays discharging into the gas stream upstream from the fan for cooling said gas by evaporation of water therein, valves regulating operation of the sprays and limiting the quantity of water added to less than that required to saturate the gas stream at discharge temperature and thermostatic means exposed to the gas stream regulating operation of the valves whereby the temperature of gas passing the thermostatic means is maintained below said maximum temperature.

2. Apparatus for collecting solids suspended in the discharge of a cupola of the type having a charging opening and an outlet above the charging opening and which is supplied below the charging opening with air under pressure from a blower having a predetermined capacity, said apparatus comprising a conduit communicating with the cupola outlet, a fan having an inlet communicating with the conduit, the capacity of the fan being not less than two and one-half nor more than seven times the capacity of the said blower, a dust collector communicating with the fan outlet, and burner means in the cupola near the charging opening and within the current of air entering through said opening for igniting CO in the cupola.

3. Apparatus for separating solids from hot gas discharged by a cupola of the type having a charging opening, an outlet above the charging opening and a windbox below the charging opening supplied with air under pressure from a blower having a predetermined capacity, comprising a fabric filter for separating solids from a gas below 700° F., a fan discharging through the filter, the capacity of the fan being not less than two and one-half times the capacity of said blower, a thermostatic element between the fan and filter, a chamber communicating with the fan inlet, water sprays in the chamber, means for supplying water under pressure to the sprays, valves for controlling the supply of water to the sprays, means interconnecting the thermostatic element and valves for actuating one of the valves at a predetermined temperature below 700° F., a conduit interconnecting the chamber and cupola outlet including a heat radiating section exposed to the hot gas and to the atmosphere, the cross-sectional area of the conduit being less than the cross-sectional area of the chamber, said latter cross-sectional area being selected to limit gas velocity therein to less than 10 lineal feet per minute, and gas ignition means in the cupola near the charging opening.

4. Apparatus for separating solids from hot gas discharged by a cupola having a gas outlet, comprising a door pivoted to the cupola for sealing the gas outlet, a counterweight coupled to the door normally holding the door in open position, a member movable into the path of the counterweight for maintaining the door in closed position, a conduit for collecting gas from the cupola, dust collecting means connected to the conduit and temperature responsive means coupled to said member for moving the member from the path of the counterweight when predetermined gas temperature is exceeded.

5. Apparatus for collecting solids suspended in a stream of hot gas discharged by a cupola having a gas outlet, comprising a normally open door for sealing the gas outlet, trigger means for holding the door in closed position, a conduit communicating with the cupola near the door, a chamber communicating with the conduit, a fabric dust filter communicating with the chamber, heat exchange means upstream from the filter for cooling the gas, a temperature responsive element in the gas stream near the filter and means interconnecting the trigger means and temperature responsive element for actuating the former when the latter reaches a predetermined maximum temperature.

6. Apparatus for separating solid particles from a stream of hot combustible gas discharged from a cupola or the like of the type adapted to contain a charge and having means for passing combustion air through the charge comprising conduit means for collecting and cooling the hot gas, an atmospheric air inlet in the conduit means beyond the charge, a fan having an inlet communicating with the air inlet and conduit drawing air and all of the hot gas through the conduit means, gas ignition means near the air inlet, coarse particle collecting means between the air inlet and the fan, fine particle collecting means communicating with the fan outlet, heat exchanger means between the air inlet and fine particle collecting means limiting the maximum gas temperature including a radiating surface, a water spray, and thermostatic means responsive to said gas temperature for limiting said water spray to a volume less than that which can be evaporated by the hot gas.

7. Apparatus for separating solid particles from a stream of hot combustible gas discharged from a cupola or the like of the type adapted to contain a charge and having means for passing combustion air through the charge comprising conduit means for collecting and cooling the hot gas, an atmospheric air inlet in the conduit means beyond the charge, a fan having an inlet communicating with the conduit drawing air and all of the hot gas through the conduit means, gas ignition means near the air inlet, coarse particle collecting means between the air inlet and the fan, fine particle collecting means communicating with the fan outlet, heat exchanger means including a radiating surface and a water spray in the gas stream ahead of the fine particle collector means, and thermally responsive means exposed to the gas stream limiting the quantity of water introduced to less than that which can be vaporized by said hot gas.

8. The method of separating solids from the hot gases discharged by a cupola or the like comprising conducting the gases in a confined stream through a conduit, cooling the stream by spraying into the conduit, water at a rate insufficient to saturate the gases so that all the water sprayed into the conduit will be evaporated into the gases to increase their water content and lower their temperature, and while the gases remain at a temperature above the dew point passing the stream into the inlet side of a blower in said conduit and conducting the exhaust from said blower through fabric filter means to remove the solids therefrom.

9. The method of separating solids from the hot gases discharged by a cupola or the like comprising conducting the gases in a confined stream through a conduit, cooling the stream by spraying water into the conduit at a rate insufficient to saturate the gases so that all the water sprayed into the conduit will be evaporated into the gases to increase their water content and lower their temperature while simultaneously reducing the velocity of the stream to cause the larger solids to fall from it, and passing the stream through fabric filter means to remove the finer solids therefrom while the gases remain at a temperature above the dew point.

10. The method of separating solids from the hot gases discharged by a cupola or the like comprising mixing secondary air with the gases and igniting the same to burn combustible components therein, conducting the total products of combustion in a confined stream through a conduit, cooling the stream by spraying water into the conduit at a rate insufficient to saturate the gases so that all the water sprayed into the conduit will be evaporated into the gases to increase their water content and lower their temperature while simultaneously reducing the velocity of the stream to cause the larger solids to fall from it, and passing the stream through fabric filter means to remove the finer solids therefrom while the gases remain at a temperature above the dew point.

References Cited in the file of this patent

UNITED STATES PATENTS

| | | |
|---|---|---|
| Re. 19,507 | Owens | Mar. 19, 1935 |
| 614,360 | Bartlett et al. | Nov. 15, 1898 |
| 1,335,494 | Haig | Mar. 30, 1920 |
| 1,979,189 | Bowers | Oct. 30, 1934 |
| 2,057,578 | Kleisler | Oct. 13, 1936 |
| 2,203,554 | Uhri | June 4, 1940 |
| 2,368,828 | Hanson et al. | Feb. 6, 1945 |
| 2,480,230 | Elster | Aug. 30, 1949 |

FOREIGN PATENTS

| | | |
|---|---|---|
| 90,255 | Switzerland | Aug. 16, 1921 |
| 168,279 | Great Britain | Sept. 1, 1921 |